US006565172B2

(12) United States Patent

Huang et al.

(10) Patent No.: US 6,565,172 B2

(45) Date of Patent: May 20, 2003

(54) PIEZO-RESISTIVE THERMAL DETECTION APPARATUS

(75) Inventors: Tsung-Wei Huang, Taipei (TW); Chih-Ching Chen, Taipei (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/097,427

(22) Filed: Mar. 15, 2002

(65) Prior Publication Data

US 2002/0130911 A1 Sep. 19, 2002

(30) Foreign Application Priority Data

Mar. 15, 2001 (TW) ....................................... 90106122 A

(51) Int. Cl.[7] ............................ B41J 2/195; B41J 2/01; G01N 25/16; G01N 25/00

(52) U.S. Cl. ............................... 347/7; 374/55; 374/45; 347/17

(58) Field of Search ............................... 347/7, 19, 65, 347/85–87, 14, 47, 23, 58, 57, 94, 40, 20, 15, 66, 16, 17, 43, 45, 55

(56) References Cited

U.S. PATENT DOCUMENTS 5,912,684 A * 6/1999 Fujii et al. .................... 347/54
5,992,984 A * 11/1999 Imanaka et al. .............. 347/65
6,036,295 A * 3/2000 Ando et al. ..................... 347/7
6,102,530 A * 8/2000 Kim et al. ..................... 347/65
6,209,981 B1 * 4/2001 Hirano .......................... 347/7

* cited by examiner

*Primary Examiner*—Craig Hallacher
*Assistant Examiner*—Charles W. Stewart, Jr.
(74) *Attorney, Agent, or Firm*—Rabin & Berdo, P.C.

(57) ABSTRACT

A piezo-resistive thermal detection apparatus for detecting the temperature of fluid inside a cavity device, such as the temperature of ink inside an inkjet print head. The apparatus includes a detection region and a plurality of piezo-resistive devices. The detection region is disposed on the inkjet print head in the form of a rectangle and made of a semiconductor material. The piezo-resistive devices are disposed on centers of each side of the detection region, wherein stresses produced by deformation of the piezo-resistive devices are exerted on the piezo-resistive devices. When the temperature of the ink rises, the surface of the inkjet print head is heated and expands, resulting in the deformation of the thermal detection apparatus. The piezo-resistive devices experience large amounts of stress due to the deformation of the thermal detection apparatus and thus the resistances of the piezo-resistive devices change. The piezo-resistive devices are connected together in the form of a circuit bridge so that a voltage signal indicative of the changes in their resistances can be outputted. According to the voltage signal outputted, the temperature of the ink is obtained.

40 Claims, 5 Drawing Sheets

PIEZO-RESISTIVE THERMAL DETECTION APPARATUS

This application incorporates by reference of Taiwan application Ser. No. 90106122, filed on Mar. 15, 2001.

BACKGROUND OF THE INVENTION

1. Field of the Invention

The invention relates in general to an apparatus for thermal detection, and more particularly to an apparatus for detecting temperatures of fluid inside a cavity device.

2. Description of the Related Art

Most inkjet printers now use thermal inkjet print heads to eject ink droplets onto a sheet of medium, such as paper, for printing. The thermal inkjet print head includes ink, heating devices, and nozzles. The heating devices heat the ink to create bubbles until the bubbles expand enough so that ink droplets through the nozzles are fired onto the sheet of paper to form dots. Varying the sizes and locations of the ink droplets can form different texts and graphics on a sheet of paper.

The thermal inkjet technology and resolution of an inkjet printer determine the printing quality that the inkjet printer can provide. Currently, entry-level color printers provide a maximum resolution of 720 by 720 dot per inch (dpi) or 1440 by 720 dpi. The size of the droplets is related to the surface tension and viscosity of the ink, and finer size of the droplets provides higher printing resolution. As to the thermal inkjet technology, a print head structure disclosed in U.S. Pat. No. 6,102,530 to Kim, et al., is shown in FIG. 1. In order to fabricate a print head 100, a structure layer 120 is first formed on a semiconductor substrate, such as silicon wafer 140, and then a manifold 150 and a chamber 130 are formed by anisotropic etching on the silicon wafer 140. After that, ink ejectors are gradually formed and each of the ink ejectors includes a first heater 160, a second heater 165, and a nozzle 110, as shown in FIG. 1. Arrays of the ink ejectors are arranged on the print head 100 so as to eject ink 190. Since each structure of the ink ejectors is identical in practice, only a few ink ejectors are illustrated in FIG. 1 for the sake of brevity. As shown in FIG. 1, the nozzle 110 is disposed above the chamber 130 and the chamber 130 is adjacent to and in flow communication with the manifold 150. Thus, the ink 190 from a reservoir (not shown) fills each chamber 130 by passing through the manifold 150, and the ink 190 is allowed to be ejected via each nozzle 110. Note that each nozzle 110 is equipped with heaters, such as the first heater 160 and second heater 165, for heating the corresponding chamber 130 in order to increase the temperature of the ink 190 in the chamber 130. When the temperature of the ink 190 in the chamber 130 rises, bubbles are formed therein and expand correspondingly. The bubbles expand so that ink droplets are forced to be ejected via the nozzle 110 onto a printing medium. In the following, the forming process of the ink droplets is described.

FIG. 2 is a cross-sectional view of the print head 100 in FIG. 1. In FIG. 2, the first heater 160 and second heater 165 are disposed around the nozzle 110. The two heaters heat up so as to form bubbles 210 and 215. The bubbles 210 and 215 expand in the direction of arrows P as the two heaters continue to heat up, and the ink 190 in the chamber 130 is pressurized, thus it causes the ink 190 to be ejected through the nozzle 110 as an ink droplet in direction F, as shown in FIG. 2.

In brief, if a specific nozzle such as the nozzle 110 is desired to eject ink droplets, the heaters 160 and 165 disposed around the nozzle 110 are activated to heat the ink 190 in the associated chamber 130 to form bubbles 210 and 215 so as to eject ink droplets from the nozzle 110 onto a printing medium. Note that the ink 190 in the chamber 130 can reach a temperature greater than a maximum level, for example, after the nozzle 110 was used for ink ejection for a period of time. In this case, if the ink 190 at the high temperature is still heated by the heaters 160 and 165 and they are supplied with the same power used in the normal situation, the ink 190 overheats and the viscosity of the ink 190 is lowered, resulting in the degradation of the printing quality. Conversely, the ink 190 in the chamber 130 can reach a temperature smaller than a minimum level, for example, after the nozzle 110 was inactive for ink ejection for a period of time. For the ink 190 at the low temperature, if the power applied to the heaters 160 and 165 does not increase and is not greater than that used in the normal situation, the ink 190 will not reach a required temperature and ink droplets will be failed to be ejected. Thus, in order to maintain a good quality of printing, the ink 190 in the chambers 130 should be controlled within a predetermined range.

Accordingly, the technique for detecting the temperature of ink and performing thermal compensation in response to the detected temperature is important to the printing quality. An approach to the detection of the temperature of the ink is described in U.S. Pat. No. 5,696,543, "Recording head which detects temperature of an element chip and corrects for variations in that detected temperature, and cartridge and apparatus having such a head" to Koizumi, et al. In this approach, a chip employs a resistor as a temperature sensor, and an adjusting resistor used outside the chip to form a temperature detecting circuit in the form of Wheatstone bridge circuitry. This approach has the disadvantages of its complexity in detection and high production cost so that it is not suitable for mass production. Therefore, some other temperature detecting device that has better sensitivity, reduced complexity, and a low production cost is needed.

SUMMARY OF THE INVENTION

It is therefore an object of the invention to provide a piezo-resistive thermal detection apparatus for detecting the temperature of fluid inside a cavity device so that the fluid temperature is capable of being controlled within a predetermined range with heaters, such as annular heaters, thus enabling the improvement in the printing quality.

The invention achieves the above-identified object by providing a piezo-resistive temperature detection apparatus including a detection region and a plurality of piezo-resistive devices, for detecting the temperature of fluid inside a cavity device, such as an inkjet print head. For an inkjet print head, in practice, its ink temperature can be controlled within a predetermined operating thermal range by using heaters disposed around the edges of the print head. The detection region, for example a rectangular detection region made of semiconductor material, is formed on the print head. The piezo-resistive devices, for example resistors made of polysilicon, are disposed on the centers of edges of the detection region, wherein the piezo-resistive devices change their resistances in response to the deformation of the piezo-resistive devices because of stresses exerted on them. When the ink temperature rises, the surface that the detection region is disposed on (i.e., the surface of the print head) protrudes, resulting in the deformation of the piezo-resistive devices. The resistances of the piezo-resistive devices thus change because of the stresses exerted on the piezo-resistive devices. The piezo-resistive devices, such as resistors, can be connected together in the form of a circuit bridge, such as Wheatstone bridge circuitry, so that a voltage signal indicative of the changes in the resistances of the piezo-resistive devices can be outputted. In this way, the ink temperature can be obtained, based on the voltage signal outputted. In order to enhance the gauge factor of the piezo-resistive devices and thus produce a larger detection signal, the piezo-resistive devices can be doped with such as boron or phosphorous ions during manufacturing process of the piezo-resistive devices. In addition to polysilicon, the piezo-resistive devices can be made of metal, such as a material selected from the group consisting of aluminum, gold, copper, tungsten, titanium, tungsten nitride, titanium nitride, and alloys of aluminum-silicon-copper.

Other objects, features, and advantages of the invention will become apparent from the following detailed description of the preferred but non-limiting embodiments. The following description is made with reference to the accompanying drawings.

DETAILED DESCRIPTION OF THE INVENTION

In order to make the quality of inkjet printing not subject to variation in ink temperature and to maintain the quality of ink droplets to be ejected, ink temperature is to be maintained within a predetermined range, for example, between a temperature T1 to a temperature T2 (T1<T2), in practice. The predetermined range of ink temperature is a range of temperature within which the performance of ink ejection is stable and is referred to as an operating thermal range. In design, an operating thermal range can be predetermined, based on the characteristic of ink adopted. Once the operating thermal range is defined, heaters disposed on the print head can be activated to perform ink ejection if the current ink temperature is lower than the temperature T1; and the heaters can be deactivated if the ink temperature is higher than the temperature T2 or within the operating thermal range. In this way, the ink temperature is to be kept within the predetermined range of temperature, so as to maintain the printing quality.

For achieving the control of the ink temperature according to the invention, the ink temperature is detected. One or more temperature adjustment devices, such as heaters, are disposed around the edges of the print head, for heating the ink, and thermal sensors are disposed above a manifold of the print head, for detecting the temperature of the ink. In this way, a determination as to whether to activate the heaters can be made according to the detected ink temperature and thus the ink temperature can be kept within the operating thermal range. Certainly, if the ink temperature has already been within the predetermined temperature range, the heaters are unnecessary to be activated.

Figure 1:
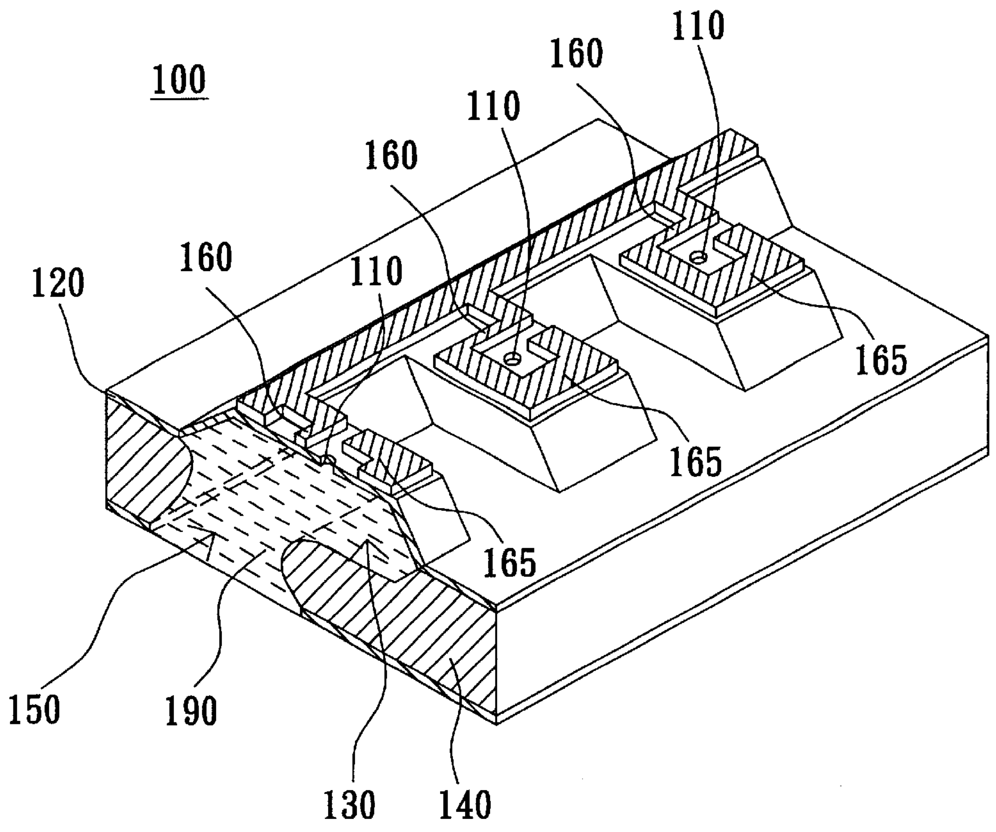
FIG. 1 (PRIOR ART)
FIG. 1 (Prior Art) is a perspective view illustrating an inkjet print head.
Figure 2:
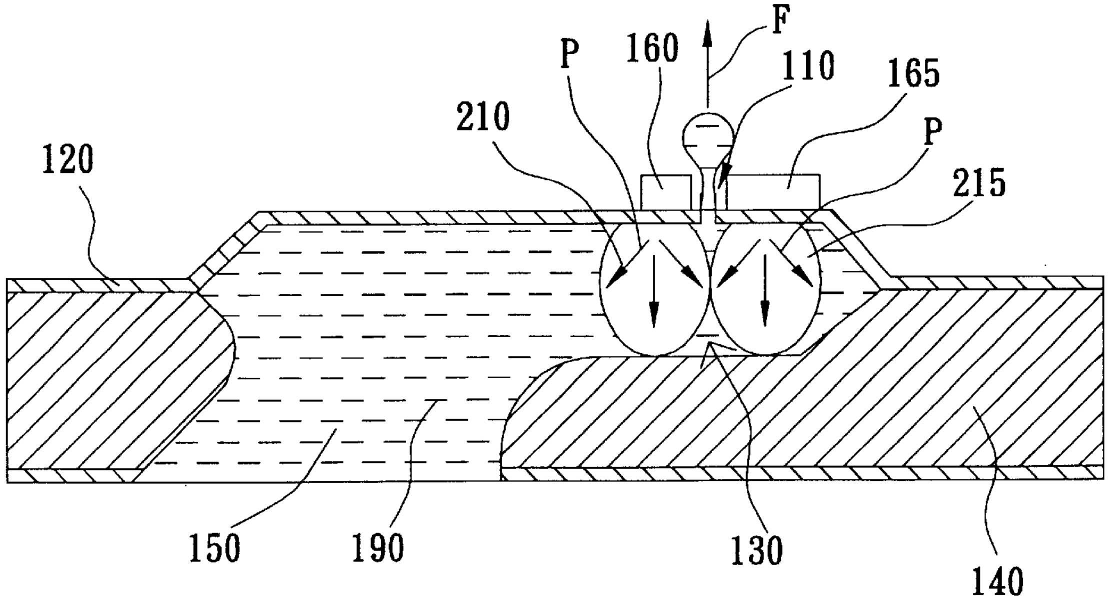
FIG. 2 (PRIOR ART)
FIG. 2 (Prior Art) is a cross-sectional view of the inkjet print head shown in FIG. 1.
Figure 3A:
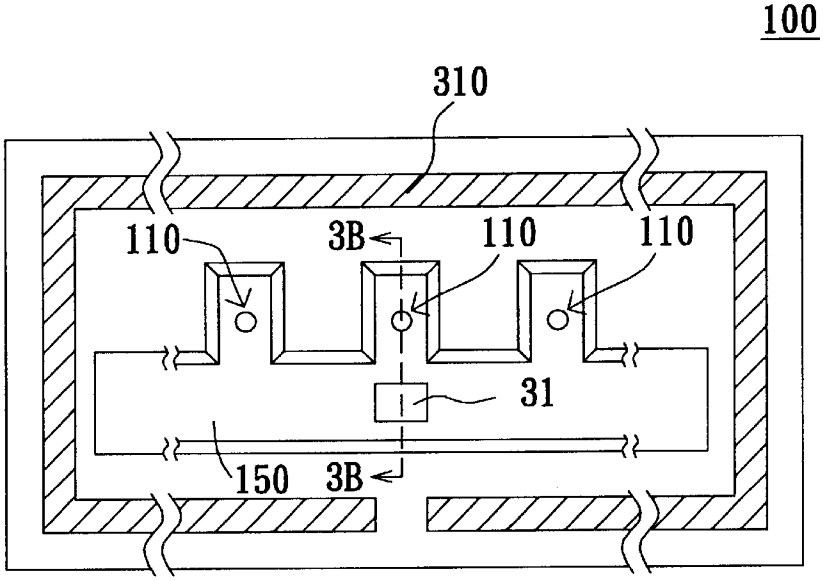
FIG. 3A illustrates a print head according to a preferred embodiment of the invention.
Figure 3B:
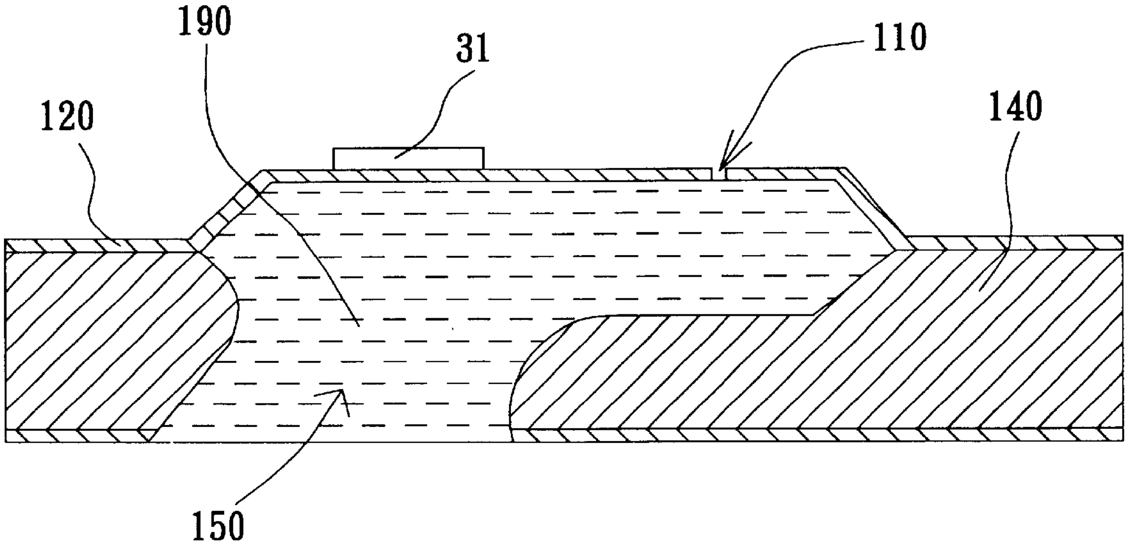
FIG. 3B is a cross-sectional view of the print head shown in FIG. 3A, taken along the line 3B—3B.

FIG. 3A illustrates a print head described above, according to a preferred embodiment of the invention, in a perspective view. In FIG. 3A, a thermal sensor 31 is disposed on a structure layer 120 (shown in FIG. 3B) of a print head 100 and above a manifold 150, and is used for detecting the temperature of ink 190 inside the print head 100. It should be noted that the temperature of the structure layer 120 is substantially equal to the ink temperature because the manifold 150 is filled with the ink 190 and the structure layer 120 has a small thickness. In other words, the ink temperature can be indirectly detected through the structure layer 120 although the thermal sensor 31 has no contact with the ink. When the ink temperature is lower than a minimum level, a heater 310 is activated to heat a silicon substrate 140 by feeding a large current into the heater 310 in a short time, resulting in a rapid increase in the temperature of the silicon substrate 140. The ink temperature also rises due to the rapid increase in the temperature of the silicon substrate 140. When the ink temperature is heated to a temperature within the operating thermal range, the heater 310 is deactivated. FIG. 3B shows a cross-sectional view of the print head in FIG. 3A, taken along line 3B—3B therein. Since the structure layer 120 has a small thickness, the region where the thermal sensor 31 is disposed will expand to the upper direction as the ink temperature rises, thus resulting in the deformation of the thermal sensor 31. According to the degree of deformation of the thermal sensor 31, the temperature of the ink 190 inside the print head 100 is determined and the timing for activating the heater 310 is thus controlled.

Figure 3C:
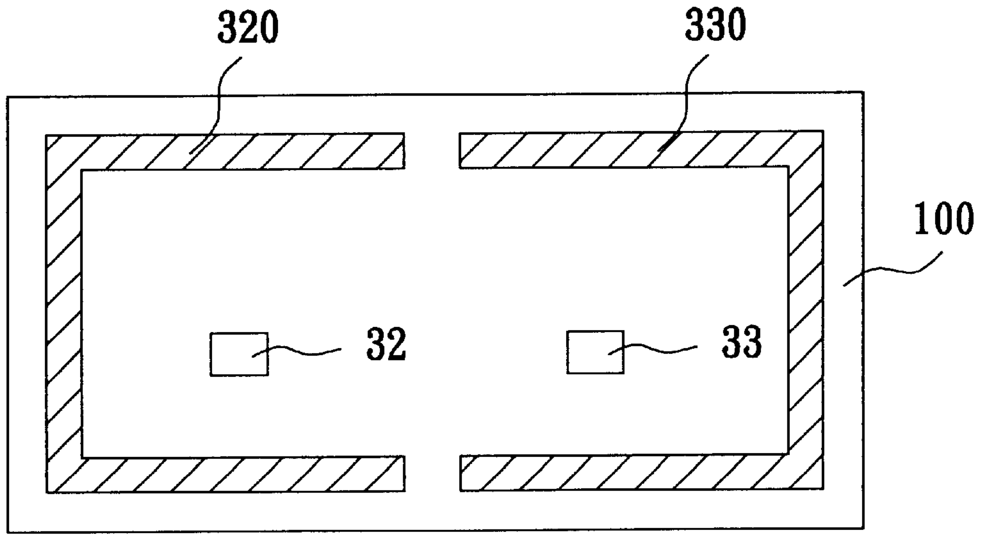
FIG. 3C illustrates a print head of the invention with two thermal sensors and two heaters.
Figure 3D:
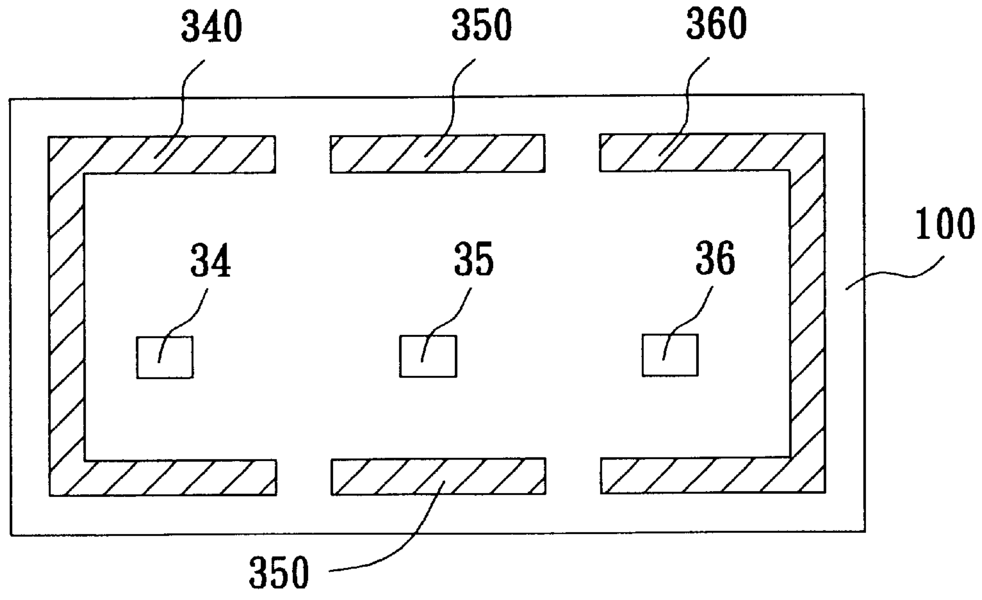
FIG. 3D illustrates a print head of the invention with three thermal sensors and three heaters.

According to the invention, ink temperature can be more accurately controlled so as to maintain the quality of ink droplets. Thermal sensors 32 and 33 are disposed above the manifold, and associated heaters 320 and 330 are disposed around the thermal sensors 32 and 33, as shown in FIG. 3C. Since the print head shown in FIG. 3C employs the same structure as the print head 100 shown in FIG. 3A, the manifold and nozzles are not shown in FIG. 3C for the sake of brevity and simplicity. By this structure, the activation of the heaters 320 and 330 can be determined according to the ink temperatures detected by the thermal sensors 32 and 33, respectively. In other words, the ink in the manifold can be divided into two temperature-controllable portions so as to achieve a more uniform distribution of the ink temperature for the print head. In practice, as in another example shown in FIG. 3D, a more accurate temperature control can be achieved by using thermal sensors 34, 35, and 36 disposed above the manifold to control the timing for activating the associated heaters 340, 350, and 360. Certainly, in print head design, the number of thermal sensors or heaters is not to be restricted to that described above. On the contrary, the arrangement or number of thermal sensors or heaters can be determined according to actual requirements so as to obtain optimal balance between the effect of temperature control and production cost.

In the following, the structure and operation of the thermal sensors are described.

In order to improve the detection effect, a large detection signal produced by the thermal detection is desired. According to Smith, C. S., "Piezoresistive effect in germanium and silicon," Phys. Rev., Vol. 94, pp. 42–49, 1954, the piezoresistive effect in silicon and germanium is 100 times higher than that in metal lines. In addition, according to Dai, Ching-Liang, "Fabrication of Micro Electro Mechanical sensors Using the standard IC Process," pp. 38–48, PhD. thesis, department of mechanical engineering, National Taiwan University, 1997, if it is required that a piezo-resistive device is capable of producing a large detection signal, the piezo-resistive device must have a high gauge factor and is implanted into a detection region where a maximum stress occurs, for example, the center of each side of a rectangular detection region, so as to improve the detection effect.

Thus, in order to apply the theories mentioned above to the thermal detection of a print head, in the invention, a semiconductor material such as polysilicon, is employed to form a detection region, including a plurality of piezo-resistive devices, on the print head for detecting the temperature of the print head. For enhancing the gauge factor of the piezo-resistive devices, in practice, the piezo-resistive devices can be doped, for example, with boron or phosphorous ions so as to produce a larger detection signal. In addition to polysilicon, the piezo-resistive devices can be made of metal, such as a material selected from the group consisting of aluminum, gold, copper, tungsten, titanium, tungsten nitride, titanium nitride, and alloys of aluminum-silicon-copper.

Figures 4, 5:
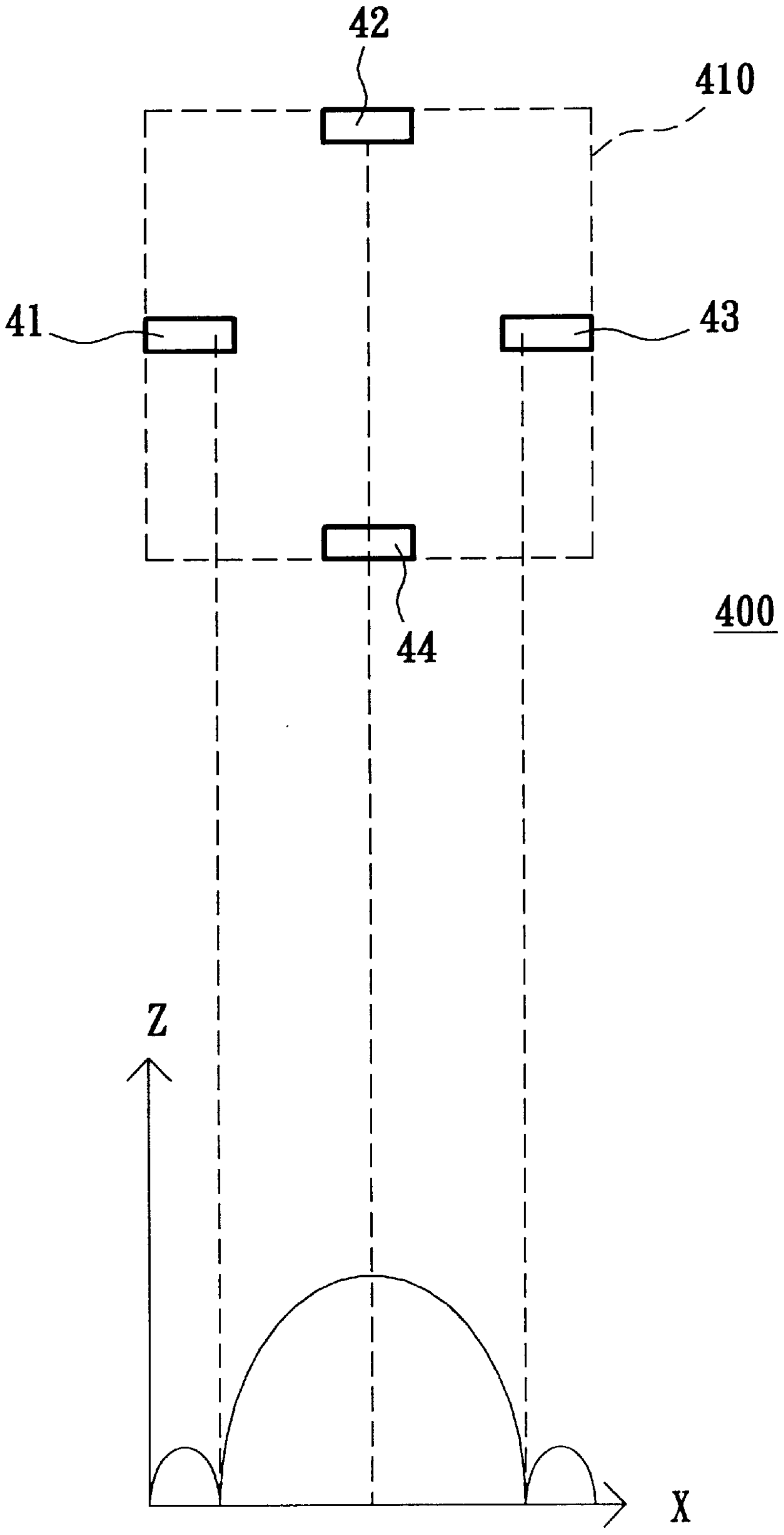
FIG. 4 illustrates the piezo-resistive thermal detection apparatus of the preferred embodiment of the invention.
FIG. 5 illustrates the expansion profile to the upper direction (z-axis) of the piezo-resistive thermal detection apparatus shown in FIG. 4.

A piezo-resistive thermal detection apparatus 400 is illustrated according to a preferred embodiment of the invention in FIG. 4. The piezo-resistive thermal detection apparatus 400 has a detection region 410, for example, in the form of a rectangle, and has piezo-resistive devices 41, 42, 43, and 44 for temperature detection. Note that, under a uniformly distributed pressure, the detection region 410 has maximum deformation in its center. That is, the detection region 410 protrudes outwards mostly in the center. Thus, the rising of the ink temperature causes the piezo-resistive devices 41, 42, 43, and 44 to protrude, resulting in changes in their values of resistance and the expansion profile as shown in FIG. 5. Further, since the deformation of the detection region 410 causes maximum stresses to exert on the centers of edges thereof, the piezo-resistive devices 41, 42, 43, and 44 can experience the maximum stresses, thus producing optimum detection results.

In practice, in order to determine the variations in resistance of the piezo-resistive devices 41, 42, 43, and 44, piezo-resistive devices, such as resistors, can be connected together in the form of a circuit bridge, such as Wheatstone bridge circuitry, so that a voltage signal indicative of the changes in the resistances of the piezo-resistive devices can be outputted. In this way, the ink temperature can be obtained, based on the voltage signal outputted.

Figure 6:
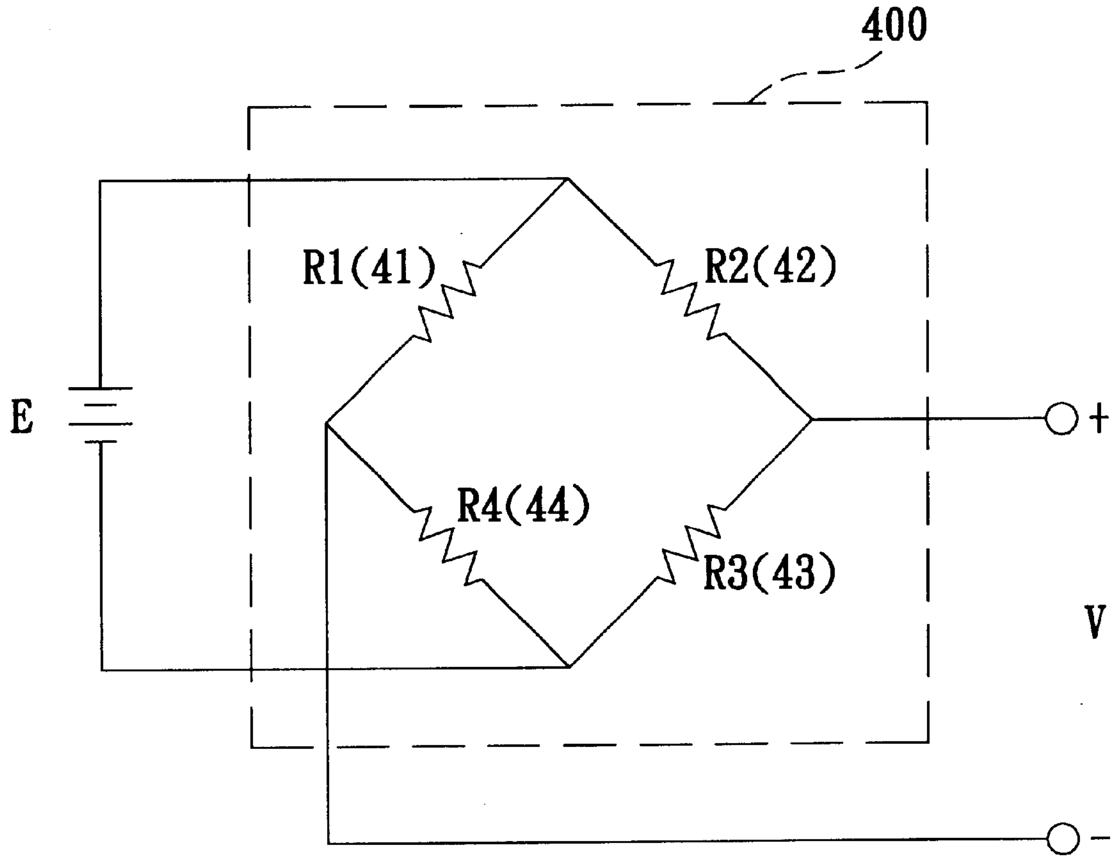
FIG. 6 shows an equivalent circuit of a Wheatstone bridge formed by the piezo-resistive thermal detection apparatus shown in FIG. 4.

FIG. 6 illustrates an equivalent circuit of Wheatstone bridge circuitry, including four resistors R1, R2, R3, R4, and an input voltage source E, and outputting an output voltage V. The four resistors R1 to R4 are equivalent to the piezo-resistive devices 41 to 44 shown in FIG. 4, respectively. Suppose that each of the four resistors R1 to R4 has a same resistance R (i.e. R1=R2=R3=R4=R) and when the detection region 410 experiences an upward bending moment, each of the resistor R1 to R4 has a variation in resistance denoted as ΔR. Referring to FIG. 4, since the piezo-resistive devices 41 and 43 (equivalent to resistors R1 and R3) are disposed toward a direction vertical to their associated edges of the detection region 410, the piezo-resistive devices 41 and 43 each has a change in resistance of ΔR. Conversely, since the piezo-resistive devices 42 and 44 (equivalent to resistors R2 and R4) are disposed toward a direction horizontal to their associated edges of the detection region 410, the piezo-resistive devices 42 and 44 each has a change in resistance of −ΔR. Hence, the change of the output voltage is ΔV and can be expressed by $\Delta V=(\Delta R/R)E$.

As described above, the invention is to obtain the ink temperature by the relationship among the ink temperature, the deformation of the detection region, and the changes in resistance of the piezo-resistive devices. To be specific, the change in ink temperature causes the deformation of the detection region 410, resulting in the changes in the resistances of the piezo-resistive devices 41, 42, 43, and 44, that is, the changes in resistances R1, R2, R3, and R4. The changes in the resistances R1, R2, R3, and R4 result in the change in the output voltage V, denoted by ΔV. Finally, the ink temperature can be readily determined by the change in the output voltage, ΔV.

As described above, the change in temperature deforms the detection region, resulting in the changes of the resistances of the piezo-resistive devices. Thus, the embodiment of the invention is to obtain the change of the ink temperature by detecting the changes in the resistances of the piezo-resistive devices disposed on the detection region. Note that in addition to inkjet print heads, the invention can be applied to any cavity device with a fluid if the temperature of the fluid inside the cavity device can effect the deformation of its detection region. Certainly, in addition to semiconductor manufacturing process, the detection region and piezo-resistive devices can be manufactured by other manufacturing process, provided that the manufactured detection region and piezo-resistive devices can fulfil the above-described spirit of the invention. For the current state of technology, the semiconductor manufacturing process is preferably applied to the manufacturing of the piezo-resistive thermal detection apparatus in order to achieve low production cost and effectiveness of the manufacturing.

According to the embodiment of the invention, the piezo-resistive thermal detection apparatus provided by the invention has at least the following advantages.

(1) The thermal detection apparatus can be fully manufactured by a standard semiconductor manufacturing process, without adding other manufacturing procedures, and thus is capable of being produced on large scale and having both precision and yield at certain levels.

(2) The production of the thermal detection apparatus substantially does not add to the total production cost of a device that the thermal detection apparatus is to be produced on. Suppose that the device has a post-processing of etching the manifold on the silicon substrate, originally. During the manufacturing of the semiconductor device, the post-processing is also employed to make the manifold of the thermal detection apparatus. In addition, before the post-processing, thin films of the piezo-resistive thermal devices are produced on the upper surface of the manifold. Thus, the total production cost of the device has no increase substantially.

(3) The temperature control for ink ejection can be achieved by applying the thermal detection apparatus with heaters to the inkjet print head. Thus, the ink temperature can be controlled within a predetermined range for the desirable printing quality.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A piezo-resistive thermal detection apparatus, disposed on a cavity device with a fluid, for detecting a temperature of the fluid inside the cavity device, the piezo-resistive thermal detection apparatus comprising:

a detection region, formed in a surface of the cavity device; and a piezo-resistive device for thermal detection, disposed on the detection region, wherein a change in a shape of the detection region deforms the piezo-resistive device, wherein the shape of the detection region changes in response to the change in temperature of the fluid so that a resistance of the piezo-resistive device changes, and the temperature of the fluid is detected according to the degree of deformation of the piezo-resistive device.

2. The piezo-resistive thermal detection apparatus of claim 1, wherein the shape of the detection region is a rectangular shape.

3. The piezo-resistive thermal detection apparatus of claim 1, wherein the piezo-resistive device is disposed on edges of the detection region.

4. The piezo-resistive thermal detection apparatus of claim 1, wherein the cavity device is an inkjet print head.

5. The piezo-resistive thermal detection apparatus of claim 1, wherein the fluid is ink.

6. The piezo-resistive thermal detection apparatus of claim 1, wherein the detection region is formed on the cavity device by a semiconductor manufacturing process.

7. The piezo-resistive thermal detection apparatus of claim 1, wherein the piezo-resistive device is formed on the detection region by a semiconductor manufacturing process.

8. The piezo-resistive thermal detection apparatus of claim 7, wherein the piezo-resistive device is made of polysilicon.

9. The piezo-resistive thermal detection apparatus of claim 8, wherein the polysilicon is doped with boron ions.

10. The piezo-resistive thermal detection apparatus of claim 8, wherein the polysilicon is doped with phosphorous ions.

11. The piezo-resistive thermal detection apparatus of claim 1, wherein the piezo-resistive device is made of metal.

12. The piezo-resistive thermal detection apparatus of claim 11, wherein the metal is a material selected from the group consisting of aluminum, gold, copper, tungsten, titanium, tungsten nitride, titanium nitride, and alloys of aluminum-silicon-copper.

13. A piezo-resistive thermal detection apparatus, disposed in a cavity device with a fluid, for detecting a temperature of the fluid inside the cavity, the piezo-resistive thermal detection apparatus comprising:

a detection region, disposed on the cavity device; and a plurality of piezo-resistive devices, disposed in edges of the detection region and coupled in a form of a bridge of circuitry, wherein a shape of the detection region changes as the temperature of the fluid changes so that resistances of the piezo-resistive devices change, whereby the temperature of the fluid is detected.

14. The piezo-resistive thermal detection apparatus of claim 13, wherein the bridge of circuitry is a Wheatstone bridge.

15. The piezo-resistive thermal detection apparatus of claim 14, wherein the piezo-resistive devices comprise four piezo-resistive devices and the Wheatstone bridge is formed by the four piezo-resistive devices.

16. The piezo-resistive thermal detection apparatus of claim 15, wherein the resistances of the four piezo-resistive devices are equal.

17. The piezo-resistive thermal detection apparatus of claim 15, wherein the piezo-resistive devices are disposed on centers of the edges of the detection region.

18. The piezo-resistive thermal detection apparatus of claim 13, wherein the piezo-resistive devices are disposed on centers of the edges of the detection region.

19. The piezo-resistive thermal detection apparatus of claim 13, wherein the resistances of the piezo-resistive devices are equal.

20. The piezo-resistive thermal detection apparatus of claim 13, ) wherein the shape of the detection region is a rectangular shape.

21. The piezo-resistive thermal detection apparatus of claim 13, wherein an output voltage of the piezo-resistive thermal detection apparatus changes as the resistances of the piezo-resistive devices change.

22. The piezo-resistive thermal detection apparatus of claim 13, wherein the cavity device is an inkjet print head.

23. The piezo-resistive thermal detection apparatus of claim 13, wherein the fluid is ink.

24. The piezo-resistive thermal detection apparatus of claim 13, wherein the detection region is formed on the cavity device by a semiconductor manufacturing process.

25. The piezo-resistive thermal detection apparatus of claim 13, wherein the piezo-resistive devices are formed on the detection region by a semiconductor manufacturing process.

26. The piezo-resistive thermal detection apparatus of claim 25, wherein the piezo-resistive devices are made of polysilicon.

27. The piezo-resistive thermal detection apparatus of claim 26, wherein the polysilicon is doped with boron ions.

28. The piezo-resistive thermal detection apparatus of claim 26, wherein the polysilicon is doped with phosphorous ions.

29. The piezo-resistive thermal detection apparatus of claim 13, wherein the piezo-resistive devices are made of metal.

30. The piezo-resistive thermal detection apparatus of claim 29, wherein the metal is a material selected from the group consisting of aluminum, gold, copper, tungsten, titanium, tungsten nitride, titanium nitride, and alloys of aluminum-silicon-copper.

31. An apparatus for ejecting fluid, based on a semiconductor substrate, comprising:

a manifold, formed by a semiconductor etching process on the semiconductor substrate, for being filled with a fluid; and a temperature adjustment device, disposed above the manifold, for heating the semiconductor substrate so as to adjust the temperature of the fluid, wherein the temperature adjustment device is substantially in the shape of a loop.

32. The apparatus of claim 31, wherein the semiconductor substrate is silicon substrate.

33. The apparatus of claim 31, wherein the apparatus is an inkjet print head.

34. The apparatus of claim 31, wherein the fluid is ink.

35. The apparatus of claim 31, wherein the temperature adjustment device is a heater.

36. The apparatus of claim 31, wherein the temperature adjustment device is disposed around edges of the manifold.

37. The apparatus of claim 31, wherein the temperature adjustment device is disposed around edges of the semiconductor substrate.

38. The apparatus of claim 31, wherein the shape of the temperature adjustment device is substantially rectangular.

39. The apparatus of claim 31, further comprising a plurality of thermal sensing devices, disposed above the manifold, for detecting a temperature of the fluid.

40. The apparatus of claim 39, wherein the temperature adjustment device is divided into a plurality of parts, and each of the parts surrounds the corresponding thermal sensing devices.

* * * * *